UNITED STATES PATENT OFFICE.

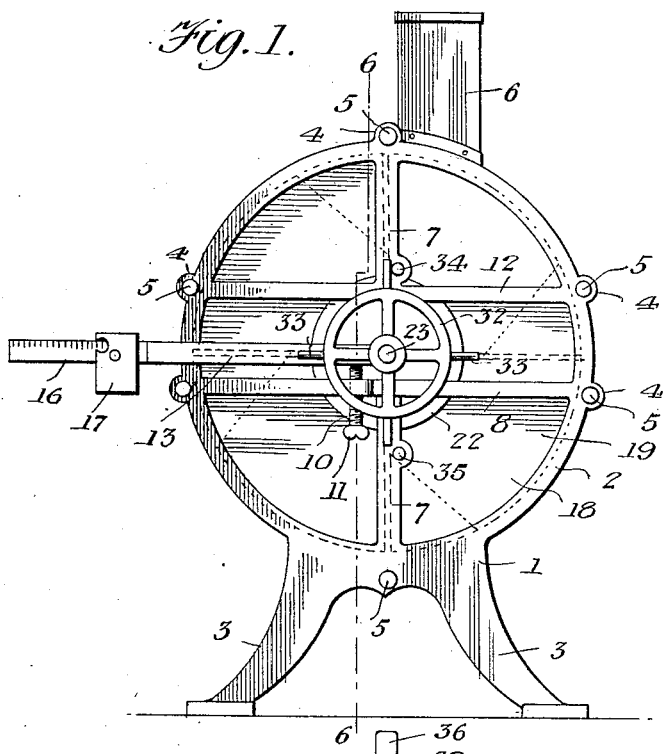
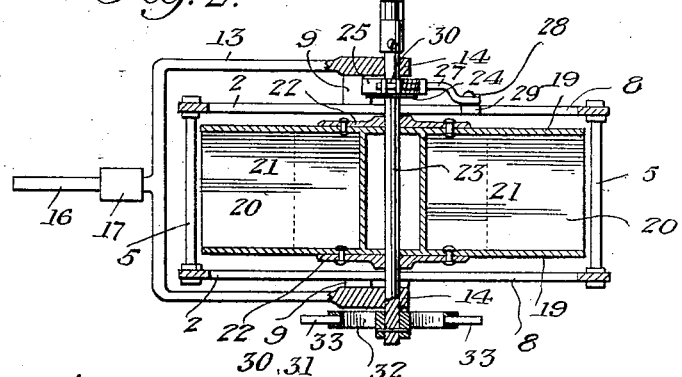
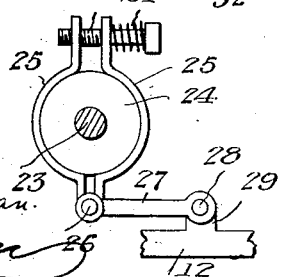

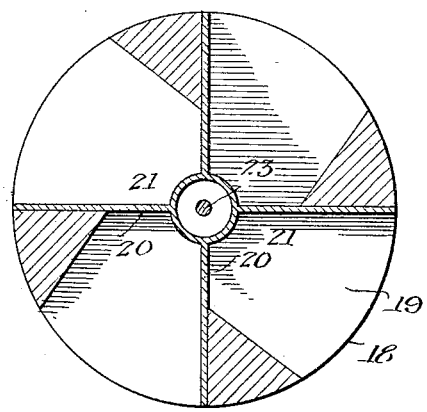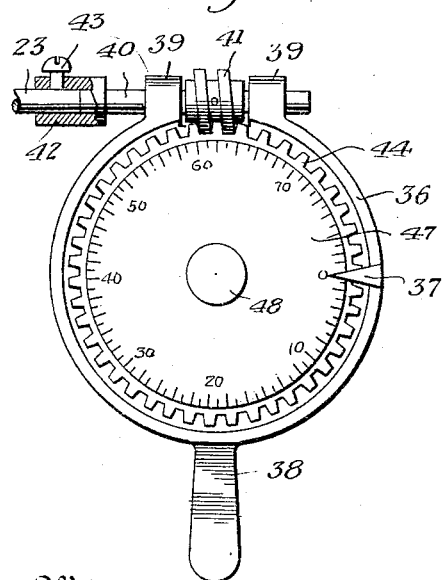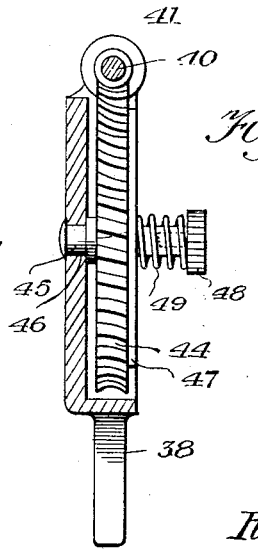

ROBERT L. HENDERSON, OF WEST, TEXAS.

AUTOMATIC ROTARY WEIGHING-SCALE.

1,354,394.     Specification of Letters Patent.    Patented Sept. 28, 1920.

Application filed February 10, 1919. Serial No. 276,073.

*To all whom it may concern:*

Be it known that I, ROBERT L. HENDERSON, a citizen of the United States, residing at West, in the county of McLennan and State of Texas, have invented new and useful Improvements in Automatic Rotary Weighing-Scales, of which the following is a specification.

This invention is an improved automatic rotary weighing scale, adapted for use in weighing cotton seed as the same is ginned, and also adapted to be used at mills, elevators, and the like, for weighing grain or for any other analogous purposes.

The object of the invention is to provide an improved weighing scale of this kind which is simple in construction, is automatic and reliable in operation, and which is not likely to get out of order.

With the above and other objects in view, the invention consists in the construction, combination and arrangement of devices hereinafter described and claimed.

In the accompanying drawings:

Figure 1 is an elevation of an automatic rotary weighing scale constructed and arranged in accordance with my invention.

Fig. 2 is a horizontal sectional view of the same.

Fig. 3 is a detail view.

Fig. 4 is an elevation of the indicator arranged for use in connection with the weighing scale.

Fig. 5 is a similar view at right angles to Fig. 4.

Fig. 6 is a vertical sectional view taken on the line 6—6 of Fig. 1.

Fig. 7 is a detail view of the brake mechanism.

In the embodiment of my invention, I provide a main frame 1 which is here shown as comprising a pair of circular side members 2 having supporting legs 3 and also provided at the peripheries with lugs 4 through which bolt rods 5 extend, the said bolt rods securing the side members of the main frame together in suitable spaced relation. At the upper side of the main frame is a hopper 6. The side members of the main frame are each provided with a vertical arm 7 and a horizontal arm 8 which extend thereacross. The horizontal arms are provided at points a suitable distance from the center of the main frame with lugs 9 through which extend vertically arranged fulcrums 10 which, in practice, are screws so that they can be vertically adjusted and have wings 11 at their lower ends to enable them to be readily, manually turned. Each side member of the frame is also provided with a horizontally arranged arm 12 which is spaced a suitable distance above the arm 8.

A horizontally arranged substantially U-shaped balancing frame 13 has its arms provided at their inner ends with bearings 14. The said arms are provided in their under sides with conical recesses 15 into which the upper ends of the fulcrumed screws 10 project, so that the balancing frame is fulcrumed and supported on the said screws. At its outer end the balancing frame is provided with a scale arm 16 which is suitably graduated and on which is an adjustable weight 17 which may be arranged at any desired point on said scale arm.

I also provide a revoluble circular member 18 which is of approximately the same diameter as the main frame and which comprises side walls 19 and partition walls 20 which provide radially arranged compartments 21 in the said revoluble elements, the said compartments being adapted to receive the material which is to be weighed. On the sides 19 at the centers are hub disks 22. The revoluble member 18 is arranged in the main frame and between the arms of the balancing frame and has an axle shaft 23 which is mounted in the bearings 14 so that the revoluble member is mounted on and carried by the balancing frame and is adapted to move downwardly and upwardly with the inner end of the balancing frame and as will be understood.

On one end of the axle shaft 23 is a brake wheel 24 which is engaged by friction brake shoes 25 which are pivotally connected together as at 26 and are also pivotally connected to an arm 27, the said arm being pivotally connected as at 28 to a suitable lug or projection 29 on one side of the main frame. An adjusting screw 30 loosely connects the brake shoes together and is provided with a tension spring 31. By adjusting the screw the tension of the spring may be varied. Said screw serves in connection with the adjusting screw to press the brake shoes on opposite sides of the periphery of the brake wheel and hence the rotation of the revoluble element is controlled.

Near the opposite end of the axle shaft is a revoluble stop wheel 32 which is provided with radially arranged stop pins 33 which correspond in number with the compartments of the revoluble element. One side of the main frame is also provided with a fixed stop pin 34 which is arranged above the said stop wheel and a fixed stop pin 35 which is arranged below said stop wheel.

Normally, and when the revoluble weighing element is empty, the same is raised by the weight 17 and the balancing frame and the upper fixed stop pin 34 is then arranged in the path of the revoluble stop pins 33 and engages the uppermost one of them so that said revoluble element is held against rotation and with one of its compartments below the hopper.

When the said compartment has been filled with material to the required weight, according to the adjustment of the weight 17, the balancing frame is lowered at its inner end, together with the weighted revoluble elements. Such downward movement of the revoluble element causes the uppermost stop pin 33 to move below the fixed upper stop pin 34, and clear the latter and hence the revoluble element is then free to turn and is caused to do so by the weighted compartment. Such downward movement of the revoluble element causes the lower fixed stop pin 35 to become arranged within the path of movement of the stop pins 33 so that one of said stop pins 33 engages said stop pin 35 when said revoluble element has made a partial rotation. When this occurs the weighted compartment of said revoluble element discharges itself of its contents by gravity, another compartment is brought into position under the hopper, the balancing frame then raises said revoluble element and reëngages the uppermost stop pin 33 with the other upper fixed stop pin 34 and the operation then proceeds as before.

It will be understood that the scale is entirely automatic in operation and after it has been adjusted it requires no further attention than to be supplied with material to be weighed through the hopper.

To register the material weighed by the scales, I provide a registering mechanism which is shown in Figs. 4 and 5 and which I will now describe. A circular frame 36 is provided at the top, on the front side with a pointer 37 and is provided at the lower side with a handle 38. At the upper side the said frame is also provided with bearings 39 in which a shaft 40 is mounted, the said shaft having a worm 41 and being provided at one end with a coupling sleeve 42 which coupling sleeve is adapted to receive one end of the axle shaft 23 and also has a set screw 43 to engage said axle shaft and thereby cause the shaft 40 to revolve with the axle shaft. In the frame, which is open on the front side, is arranged a gear 44 which is engaged by the worm and the arbor 45 of which has a bearing as at 46 in the center of the frame. A numbered dial 47 is secured to the said arbor for rotation therewith and is held in place by a screw 48 and a spring 49.

The indicator hangs from the axle shaft of the scales and as said shaft makes its partial rotations during the operation of the scale the worm 41 is correspondingly revolved and by engagement with the gear 44 causes the latter to also turn and to turn the dial therewith, the pointer 37 and the dial indicating the quantity of material which has been weighed by the scale, as will be understood.

While I have herein shown and described a preferred embodiment of my invention, I would have it understood that changes may be made in the form, proportion and construction of the several parts, without departing from the spirit of my invention, and within the scope of the appended claims.

Having thus described my invention, I claim:

1. In a revoluble automatic scale, a support, a balancing frame provided with weighing means, a revoluble element mounted on the balancing frame and having material receiving compartments, radially arranged stops movable revolubly and vertically with the revoluble member and fixed stops arranged one in the path of the revoluble stops when the revoluble member is raised by the balancing frame and the other in the path of the revoluble stops when the revoluble member is lowered by the weight of its contents.

2. In a revoluble automatic scale, a supporting frame, a balancing frame pivotally mounted on the supporting frame and provided with weighing means, a revoluble element mounted on the balancing frame and having material receiving compartments, radially arranged stops corresponding in number with the compartments and arranged to revolve and to move vertically with the revoluble member, and fixed stops secured to the supporting frame and arranged one in the path of the revoluble stops when the revoluble member is raised by the balancing frame and the other in the path of the revoluble stops when the revoluble member is lowered by the weight of its contents.

3. In a revoluble automatic scale, a supporting frame, a balancing frame pivotally mounted on the supporting frame and provided with weighing means, a revoluble element having an axle shaft mounted on the balancing frame and also having material receiving compartments, a stop wheel secured to the axle shaft and having radially arranged stops corresponding in number with the compartments of the revoluble element, and fixed stops projecting from the supporting frame and arranged one in the path of the revoluble stops when the revoluble member is raised by the balancing frame and the other in the path of the revoluble stops when the revoluble member is lowered by the weight of its contents.

In testimony whereof I affix my signature.

ROBERT L. HENDERSON.